United States Patent
Derby, V et al.

(10) Patent No.: US 8,660,744 B2
(45) Date of Patent: Feb. 25, 2014

(54) SPEED CONTROL SYSTEM FOR WALK BEHIND POWERED EQUIPMENT

(75) Inventors: Harry L. Derby, V, Charlotte, NC (US); Bryan E. Holby, Charlotte, NC (US)

(73) Assignee: Textron Innovations Inc., Providence, RI (US)

( * ) Notice: Subject to any disclaimer, the term of this patent is extended or adjusted under 35 U.S.C. 154(b) by 962 days.

(21) Appl. No.: 11/865,912

(22) Filed: Oct. 2, 2007

(65) Prior Publication Data
US 2008/0021609 A1 Jan. 24, 2008

Related U.S. Application Data

(63) Continuation-in-part of application No. 10/851,988, filed on May 21, 2004, now Pat. No. 7,275,615.

(51) Int. Cl.
*G06F 7/00* (2006.01)
*A01D 69/00* (2006.01)

(52) U.S. Cl.
USPC .............................................. 701/36; 56/10.8

(58) Field of Classification Search
USPC ............................................. 56/10.8; 701/36
See application file for complete search history.

(56) References Cited

U.S. PATENT DOCUMENTS

| | | | |
|---|---|---|---|
| 4,213,288 A | 7/1980 | Takeuchi et al. | |
| 4,558,558 A * | 12/1985 | Horner et al. | 56/11.3 |
| 4,726,178 A | 2/1988 | Mallaney et al. | |
| 4,924,663 A | 5/1990 | Ehn, Jr. et al. | |
| 5,155,985 A | 10/1992 | Oshima et al. | |
| 5,297,379 A | 3/1994 | Smith | |
| 5,343,678 A | 9/1994 | Stuart | |
| 5,822,965 A | 10/1998 | Chesack et al. | |
| 6,109,009 A | 8/2000 | Benson | |
| 6,339,916 B1 | 1/2002 | Benson | |
| 6,347,502 B1 | 2/2002 | deVries | |
| 6,523,334 B1 | 2/2003 | Dettmann | |
| 6,644,002 B2 * | 11/2003 | Trefz | 56/10.8 |
| 6,698,171 B2 | 3/2004 | Doerflinger | |
| 2003/0084655 A1 | 5/2003 | Rush et al. | |
| 2003/0085680 A1 * | 5/2003 | Wakitani et al. | 318/432 |
| 2005/0126146 A1 * | 6/2005 | Velke et al. | 56/16.7 |
| 2005/0144919 A1 * | 7/2005 | Osborne | 56/10.8 |

FOREIGN PATENT DOCUMENTS

| | | |
|---|---|---|
| DE | 19601694 | 7/1997 |
| FR | 2631206 | 11/1989 |

* cited by examiner

*Primary Examiner* — Thomas Tarcza
*Assistant Examiner* — Imran Mustafa
(74) *Attorney, Agent, or Firm* — Harness, Dickey & Pierce, P.L.C.

(57) ABSTRACT

A walk-behind self-propelled apparatus having a mobile structure and a handle assembly coupled to the mobile structure. The handle assembly includes a pair of grip portions. A ground engaging traction member is rotatably coupled to the mobile structure and imparts traction movement to the mobile structure for movement on the ground. A power source outputs drive power and a drive system, coupled between the power source and the ground engaging traction member, selectively transmits the drive power to the ground engaging traction member. A speed control actuation system coupled to the drive system includes a control member pivotable about an axis. An electronic member senses a control member rotation and relays an electronic signal to a controller which generates a linear speed control signal to the drive system.

15 Claims, 7 Drawing Sheets

SPEED CONTROL SYSTEM FOR WALK BEHIND POWERED EQUIPMENT

CROSS REFERENCE TO RELATED APPLICATIONS

This application is a continuation-in-part of U.S. patent application Ser. No. 10/851,988 filed on May 21, 2004. The disclosure of the above application is incorporated herein by reference.

FIELD

The present disclosure relates to powered equipment and, more particularly, relates to a speed control system for walk behind powered equipment that provides improved ergonomics, functionality, and safety.

BACKGROUND

The statements in this section merely provide background information related to the present disclosure and may not constitute prior art.

As is known in the art, self propelled powered equipment is often used in a wide variety of applications, such as lawn mowers, greens mowers, roto-tillers, aerators, snowblowers, and the like. Self propelled powered equipment typically includes an engine, either an internal combustion engine and/or electric motor, that is used to power a drive system. These drive systems traditionally include a friction device or gear train that transmits motive power from the engine to at least one drive wheel or roller. The drive system may be actuated in response to any one of a number of operator inputs, including gear shifters, levers, and the like. However, often these operator input systems are used to translate a cable coupled to the drive system to position the drive system in any one of a number of desired motive configurations.

However, recently there has been an interest in improving the operation of these operator input systems. That is, there has been a need to improve the operation, reliability, durability, and safety thereof. Additionally, there exists a need in the relevant art to improve these input systems to simplify their operation and provide improved control. Additionally, there is a need in the relevant art to provide a speed control system that overcomes the disadvantages of the prior art.

SUMMARY

According to the principles of the present disclosure, a walk-behind self-propelled apparatus having an advantageous construction is provided. The walk-behind self-propelled apparatus includes a mobile structure and a handle assembly coupled to the mobile structure. The handle assembly includes a pair of grip portions. A ground engaging traction member is rotatably coupled to the mobile structure and imparts traction movement to the mobile structure for movement on the ground. A power source outputs drive power and a drive system, coupled between the power source and the ground engaging traction member, selectively transmits the drive power to the ground engaging traction member. A speed control actuation system is then coupled to the drive system and includes a control member pivotable about an axis. The axis is generally parallel to a plane extending between the pair of grip portions of the handle assembly to permit an operator to operate the control member merely through thumb actuation without removing their hands from the pair of grip portions.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
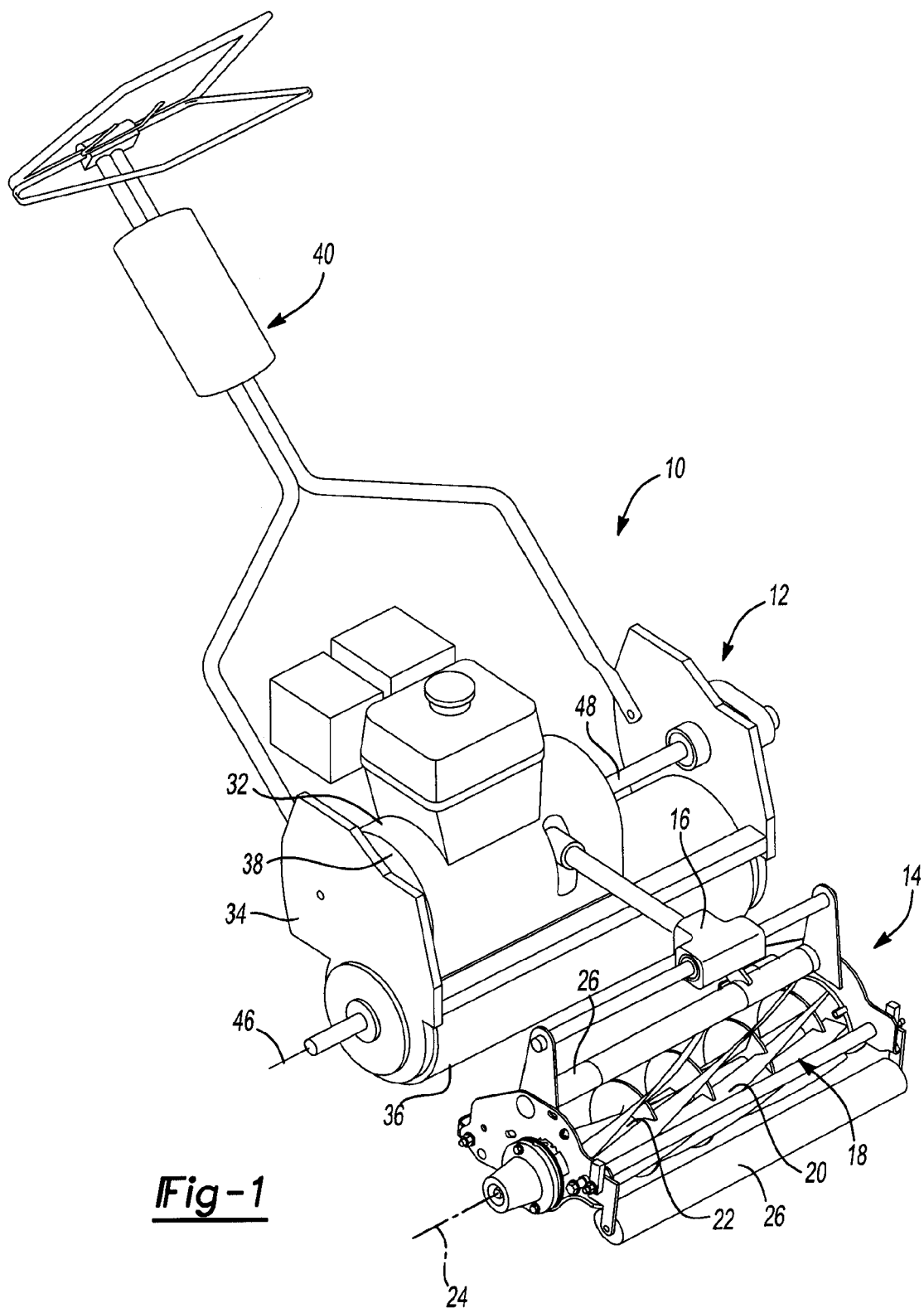
FIG. 1 is a perspective view illustrating a greens mower according to the principles of the present disclosure.

The following description is merely exemplary in nature and is not intended to limit the present disclosure, application, or uses. It should be understood that throughout the drawings, corresponding reference numerals indicate like or corresponding parts and features. For example, the present disclosure may find utility in a wide variety of applications, including use in lawn mowers, greens mowers, roto-tillers, aerators, snowblowers, and the like. However, in the following description, the present disclosure will be described in connection with a greens mower. Such description should not be regarded as limiting the present disclosure.

With reference to the figure, FIG. 1 illustrates a greens mower 10 incorporating the principles of the present disclosure. Greens mower 10 is a reel-type mower having a base portion 12 and a floating or articulating mowing unit 14. Mowing unit 14 is articulately coupled to base portion 12 through a pivoting mechanism 16.

Mowing unit 14 includes a rotatable greens mower reel 18 having spiraled blades 20 equally spaced around a reel shaft 22. Reel shaft 22 is generally elongated and defines a rotation axis 24 extending along the length of reel shaft 22. A conventional fixed bed knife (not shown) is operably mounted to mowing unit 14. Blades 20 orbit relative to shaft 22 and move past the fixed bed knife for the usual and well-known function of cutting the grass. Mowing unit 14 further includes a pair of ground engaging rollers 26 rotatably mounted along a forward and rearward portion of mowing unit 14. The pair of ground engaging rollers 26 serve to support mowing unit 14 for movement on the ground. The pair of ground engaging rollers 26 are preferably adjustable to define a cutting height.

Base portion 12 generally includes an internal combustion engine or electric motor 32, a frame 34, a lawn roller 36, a drive system 38, and a handle assembly 40. Internal combustion engine or electric motor 32 is of conventional design and is mounted on frame 34. Internal combustion engine or electric motor 32 may include an electric starter for improved convenience.

Lawn roller 36 is rotatably mounted to frame 34 through a roller axle 46. Lawn roller 36 supports base portion 12 on the ground and serves as the traction drive for greens mower 10. Other ground-supporting traction members could be substituted. Drive system 38 is operably coupled between an output shaft 48 and lawn roller 36. Drive system 38 generally includes a drive pulley (not shown) mounted to output shaft 48 for rotation therewith and an idler pulley (not shown) mounted to lawn roller 36 for rotation therewith. A drive belt (not shown) extends between the drive pulley and the idler pulley to transfer drive force from internal combustion engine or electric motor 32 to lawn roller 36. Thus, there exists a traction drive train from internal combustion engine or electric motor 32 to the ground-engaging lawn roller 36 capable of driving greens mower 10 in at least a forward direction.

Figure 2:
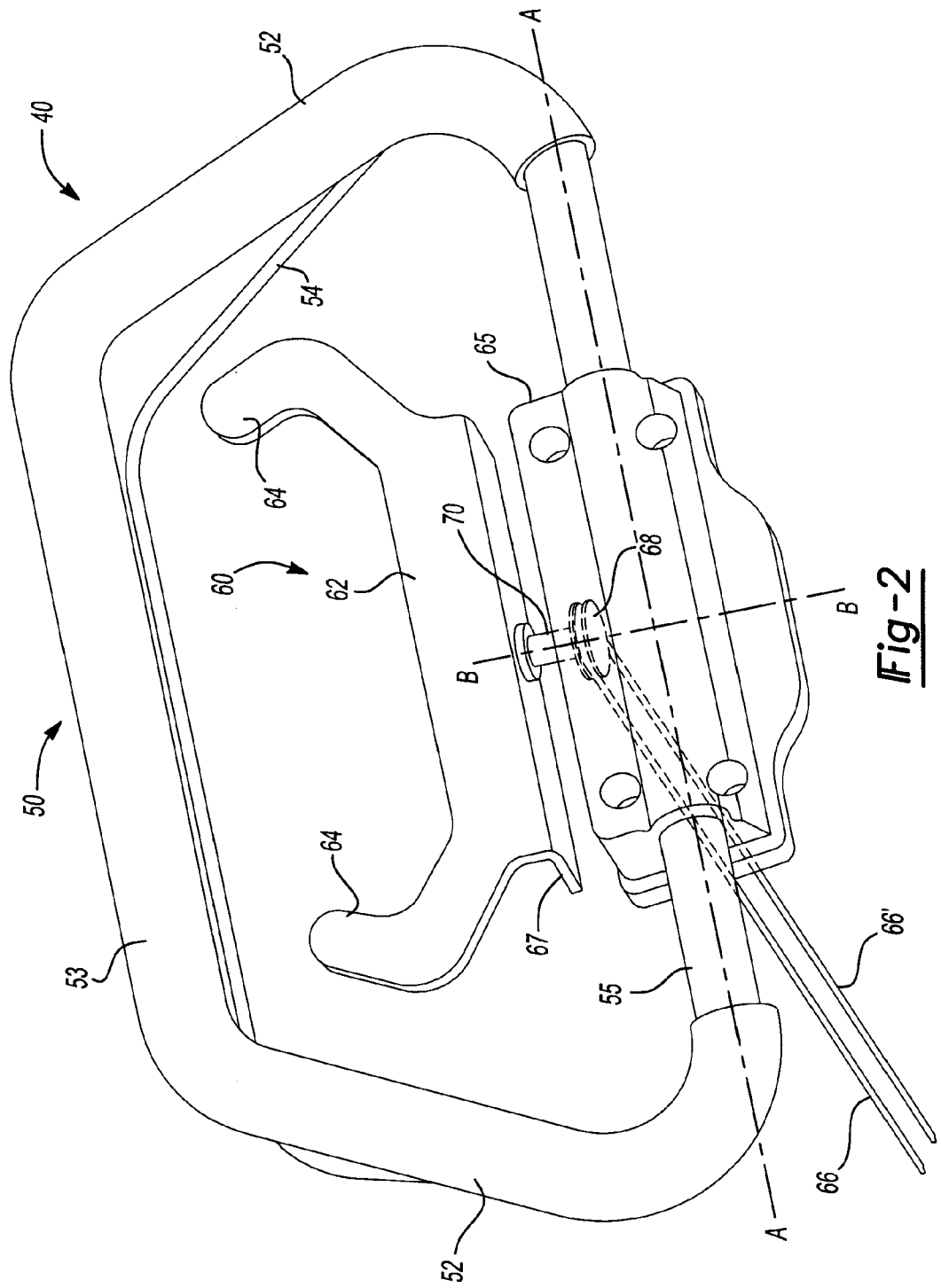
FIG. 2 is an enlarged perspective view of the speed control actuation system according to the principles of the present disclosure.

As best seen in FIG. 2, handle assembly 40 includes a handle 50 suitably connected with frame 34. Handle 50 includes a grip portion 52 which the operator can hold in steering greens mower 10. A top portion 53 interconnects distal ends of grip portions 52 and a bottom portion 55 interconnects proximal ends of grip portions 52. Bottom portion 55 of handle 50 defines a longitudinal axis A-A.

A movably mounted bail or operator hand control 54 may be pivotally connected to handle 50 and may be movable toward and away from the grip portion 52. The operation of hand control 54 may be similar to that disclosed in commonly owned U.S. Pat. No. 6,523,334, which is incorporated herein by reference. In this arrangement, the operator can hold both handle 50 and hand control 54 while guiding greens mower 10. Upon release of hand control 54, traction drive system 38 is interrupted in a manner similar to that disclosed in the '334 Patent.

Additionally, handle assembly 40 includes a speed control actuation system 60 operable to provide a control input to actuate traction drive system 38. Specifically, speed control actuation system 60 includes a paddle member 62 pivotally coupled to handle assembly 40. More particularly, paddle member 62 is generally planar in construction and generally U-shaped having a pair of upwardly projecting end portions 64. End portions 64 are disposed within thumb reach of grip portion 52 of handle 50 such that an operator may actuate paddle member 62 without removal of their hands from grip portion 52, as will be described below.

Still referring to FIG. 2, paddle member 62 is pivotally mounted to a base portion 65 of handle 50 for rotation about an axis B-B. Axis B-B is generally oriented normal to axis A-A. In other words, axis B-B is generally parallel to a plane extending through grip portions 52, top portion 53, and bottom portion 55 of handle 50. In this regard, paddle member 62 is pivotable in either direction about axis B-B by the simple application of thumb pressure from the operator. Paddle member 62 includes a generally turned flange 67 to permit the coupling of paddle member 62 to a shaft 70.

Figure 3:
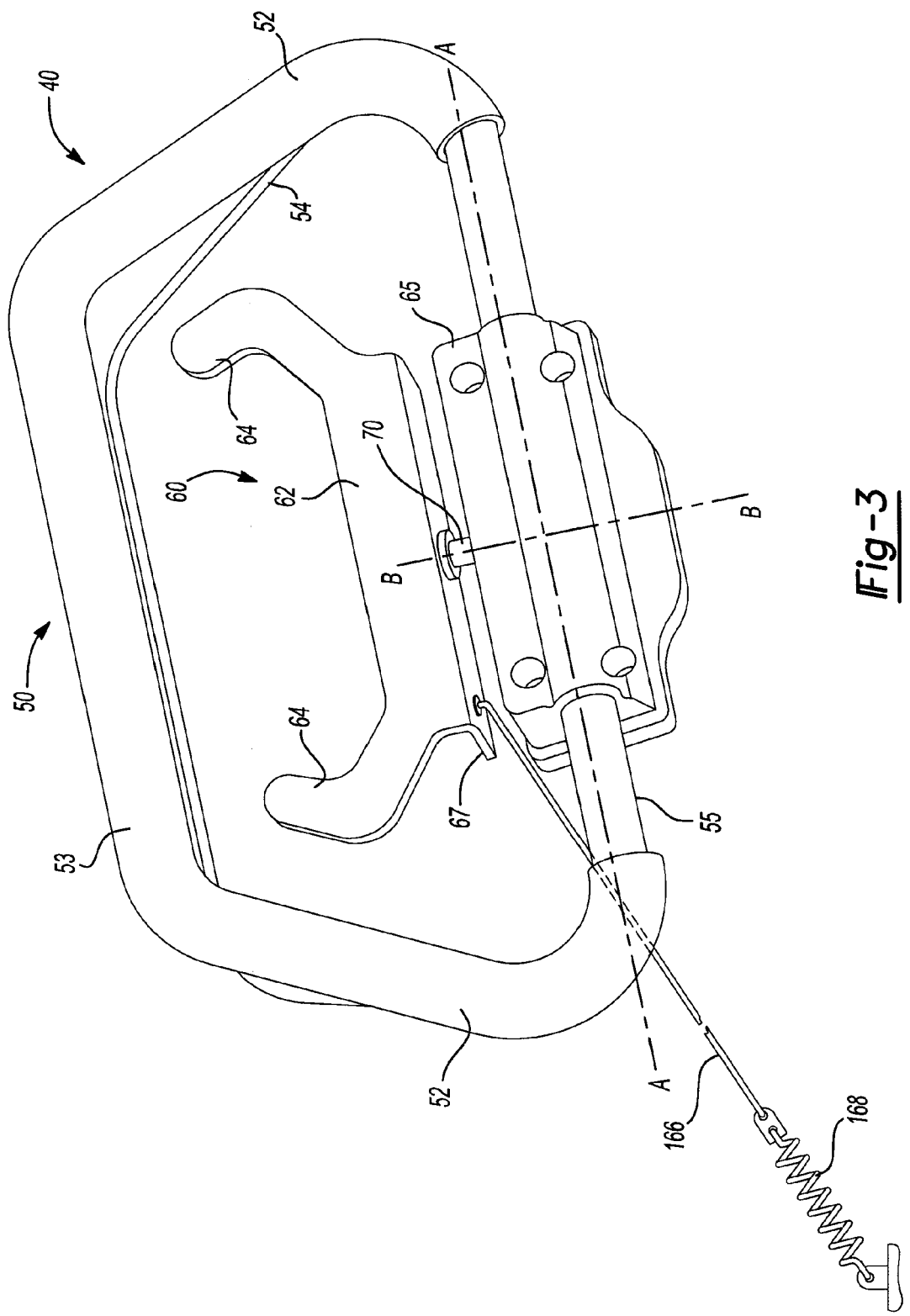
FIG. 3 is an enlarged perspective view of a further embodiment of the speed control actuation system according to the principles of the present disclosure.

Paddle member 62 is operably coupled to a cable member 66 extending to traction drive system 38. Cable member 66 transfers a control force to traction drive system 38, thereby providing at least a forward propulsion command and, optionally, a rearward propulsion command in a conventional manner. According to a first embodiment as seen in FIG. 2, cable member 66 is disposed about a pulley 68. Pulley 68 is contained within base portion 65 of handle 50 and is fixed for rotation with a shaft 70 downwardly extending from paddle member 62 through axis B-B. A return cable member 66' may be used to provide a fore and aft control movement or, alternatively, cable member 66 may be spring biased in a direction opposing paddle member 62. According to an alternative embodiment as seen in FIG. 3, a cable member 166 is operably coupled to paddle member 62 through conventional means, including fasteners, a physical relief formed in paddle member 62 that cooperates with an oversized section of cable member 166, or other systems. Cable member 166 is biased in tension via a spring member 168. In this regard, as paddle member 62 is actuated, force is applied to cable member 166 against the biasing force of spring member 168 to provide a commanded drive operation to traction drive system 38. Upon release of the pressure on paddle member 62, spring member 168 returns cable member 166 and paddle member 62 to a neutral position.

During operation, an operator can apply a controlling pressure with their thumb to one of the pair of upwardly projecting end portions 64 of paddle member 62 without removing their hand from grip portion 52 to command a desired drive movement, such as to increase travel speed. Such pressure causes paddle member 62 to rotate about shaft 70 (axis B-B) in a first direction, thereby rotating pulley 68 and applying a retracting force along cable member 66, thereby actuating traction drive system 38 in a convention manner. Alternatively, such pressure against paddle member 62 in the first direction, applies a retracting force to cable member 166, thereby actuating traction drive system 38. To decrease travel speed or engine a reverse drive gear of traction drive system 38, the operator then applies a controlling pressure with their thumb to the opposite upwardly projecting end portion 64 of paddle member 62 without removing their hand from grip portion 52. Such opposing control input causes paddle member 62 to rotate about shaft 70 (axis B-B) in a second direction opposite of the first direction, thereby rotating pulley 68 and apply either an opposing retracting force along return cable member 66' or simply permitting the biasing force in cable member 66 to retract cable member 66, or similarly permitting the biasing force of spring member 168 to retract cable member 166. This motion then commands either a slow drive movement and/or a reverse drive movement.

Figure 4:
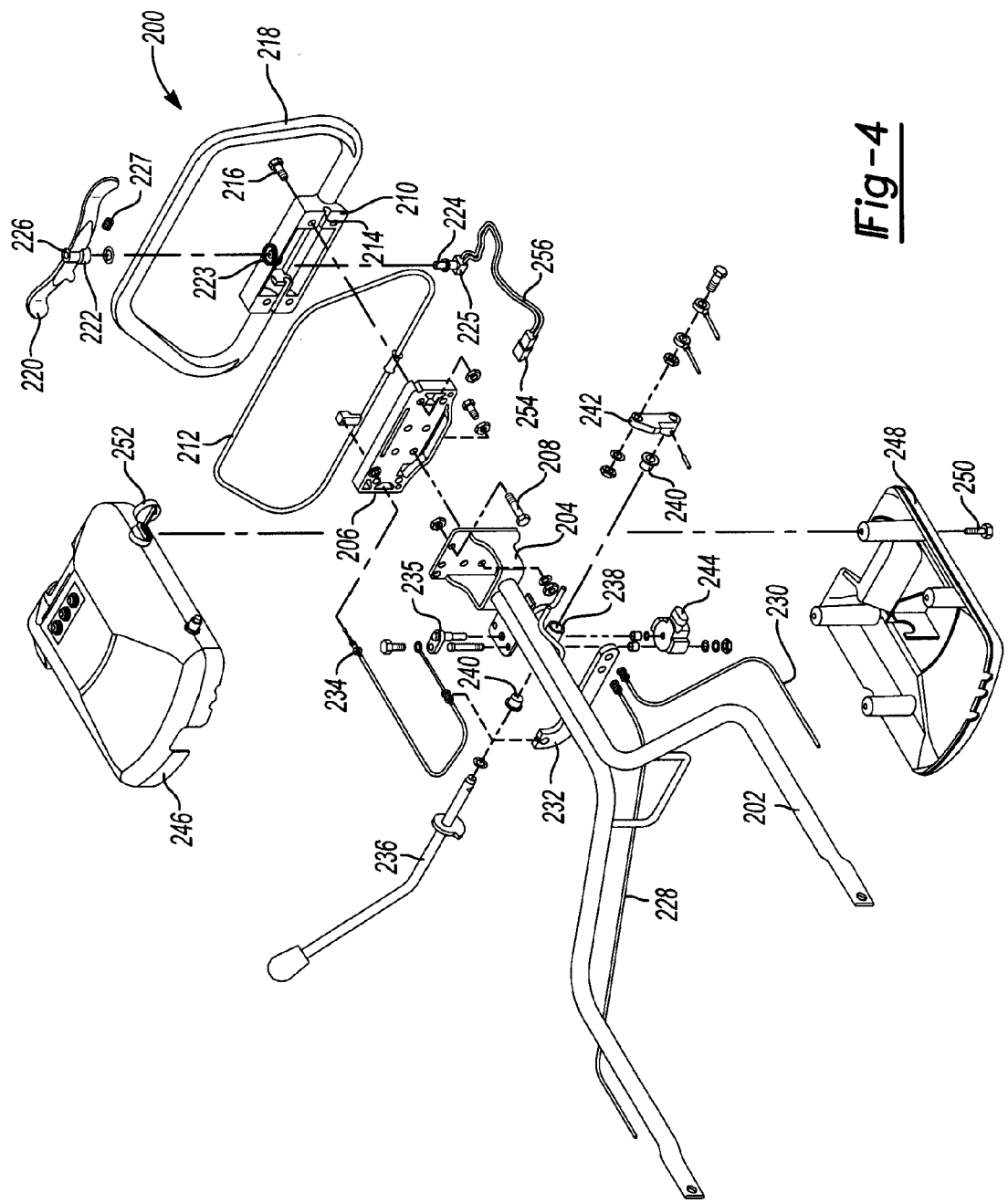
FIG. 4 is an exploded assembly view of a further embodiment of the speed control actuation system according to the principles of the present disclosure.

Referring to FIG. 4, a speed control system 200 includes a handle assembly 202, which is connected by a mounting bracket 204 to a tilt plate 206 using a plurality of fasteners 208. Tilt plate 206 is in turn connected to a handle attachment plate 210 using a plurality of fasteners 216. A bail lever 212 is rotatably connected between tilt plate 206 and handle attachment plate 210 in a bail lever receiving channel 214. A handle 218 is fixably connected to handle attachment plate 210.

A throttle plate 220 similar to paddle member 62 of FIG. 2 includes a sleeve 222 which is rotatably received within a bearing sleeve 223 created in handle attachment plate 210. A shaft 224 of a rotary potentiometer 225 is received through bearing sleeve 223 and a shaft aperture 226 of throttle plate 220. Shaft 224 is fixed with respect to throttle plate 220 using a screw 227. Rotation of throttle plate 220 therefore acts to rotate shaft 224 of rotary potentiometer 225.

Referring to both FIGS. 1 and 4, a first brake cable 228 and a second brake cable 230 are connected to mounting plate 232 which is fixed to handle assembly 202. A force transmitting cable 234 is also connected to mounting plate 232. Cable 234 receives a force input from bail lever 212 such that rotation of bail lever 212 is required by an operator of the mower or powered device in order to release the brakes and permit powered motion of greens mower 10. Cable 234 is also connected to a bail cable arm 235. An independent brake lever 236 which is rotatably received in a sleeve 238 connected to handle assembly 202 is further capable of setting or releasing the brakes of greens mower 10 by connection to each of first and second brake cables 228, 230. Brake lever 236 is rotatably received in sleeve 238 using first and second flanged bearings 240. Rotation of brake lever 236 induces rotation of a brake arm 242 which extends or retracts first and second brake cables 228, 230.

Speed control system 200 can further include a rotary switch 244 which can be used in conjunction with the brake system to shut off the internal combustion engine or electric motor 32 for example when bail lever 212 is released. A top cover member 246 and a bottom cover member 248 can be used for handle assembly 40. Top cover member 246 and bottom cover member 248 are provided to protect the members of speed control system 200 from various environmental conditions. Top and bottom cover members 246, 248 are fastened together using a plurality of cover fasteners 250. A key 252 is shown in its inserted position. Key 252 can be used to start or stop greens mower 10.

Rotary potentiometer 225 is connected to additional components of speed control system 200 (shown in reference to FIG. 5) using a connector 254 and a potentiometer harness 256. Rotation of shaft 224 of rotary potentiometer 225 creates an electrical signal based substantially on a difference in resistance as shaft 224 is rotated. This change in resistance can be measured or applied in a linear progression defining an output signal having a linear range of output values for rotary potentiometer 225.

Figure 5:
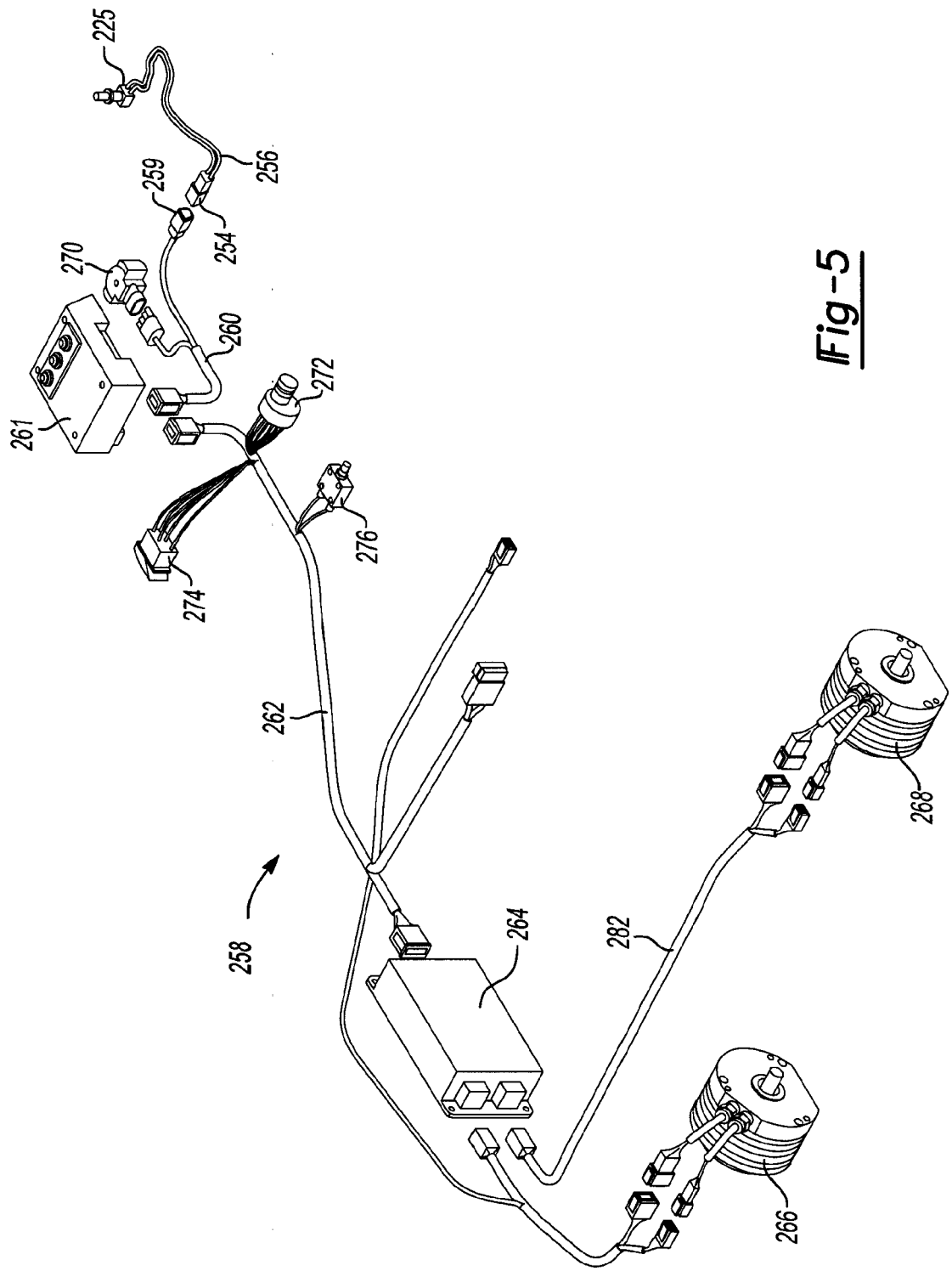
FIG. 5 is an exploded assembly view of an electronics package including a controller of the present disclosure.

Referring now to FIG. 5, speed control system 200 further includes an electronics package 258. Electronics package 258 provides a connector 259 to which connector 254 of rotary potentiometer 225 is connected. The output from rotary potentiometer 225 is therefore communicated from potentiometer harness 256 through a first wiring harness 260 into an LCD display unit 261 which is mounted as previously shown in FIG. 4 in top cover member 246. In addition to LCD display unit 261, the signals from rotary potentiometer 225 are transferred via a second wiring harness 262 to a controller 264. Controller 264 provides features to set at least minimum and maximum set points for the signal received from rotary potentiometer 225. In a null or first position of rotary potentiometer 225 a minimum set point is established in controller 264. Referring back to FIG. 4, throttle plate 220 is then rotated to its maximum position defining a maximum rotated position of shaft 224 of rotary potentiometer 225. At this maximum rotated position a second set point is defined in controller 264. Controller 264 is then capable of establishing a linear scale between the minimum and maximum set points one and two such that rotation of shaft 224 by rotation of throttle plate 220 creates an infinite range of values between the minimum and maximum set points. Increasing the rotation of throttle plate 220 provides a linearly changing signal from rotary potentiometer 225. The output signal from controller 264 can be used to control the operating speed of either a first or second electrical motor 266, 268 which can be used for example to control the ground speed of the mower assembly or a rotational velocity of a reel assembly.

Electronics package 258 can further include a bail lever potentiometer 270 which similarly outputs a signal depending upon the rotated position of bail lever 212 shown in FIG. 4. The output signal from bail lever potentiometer 270 is similarly communicated through first wiring harness 260 into LCD display unit 261 and via second wiring harness 262 to controller 264. A key switch 272 is adapted to receive the rotary motion of key 252 shown in FIG. 4 to control the start and stop sequence of greens mower 10. A reel switch 274 can also be provided which provides manually selectable on-off positions allowing an operator to manually switch off or on a reel blade assembly during operation of greens mower 10. Electrical power carried through each of the first and second wiring harnesses 260, 262 can further be protected using a circuit breaker 276.

Figure 6:
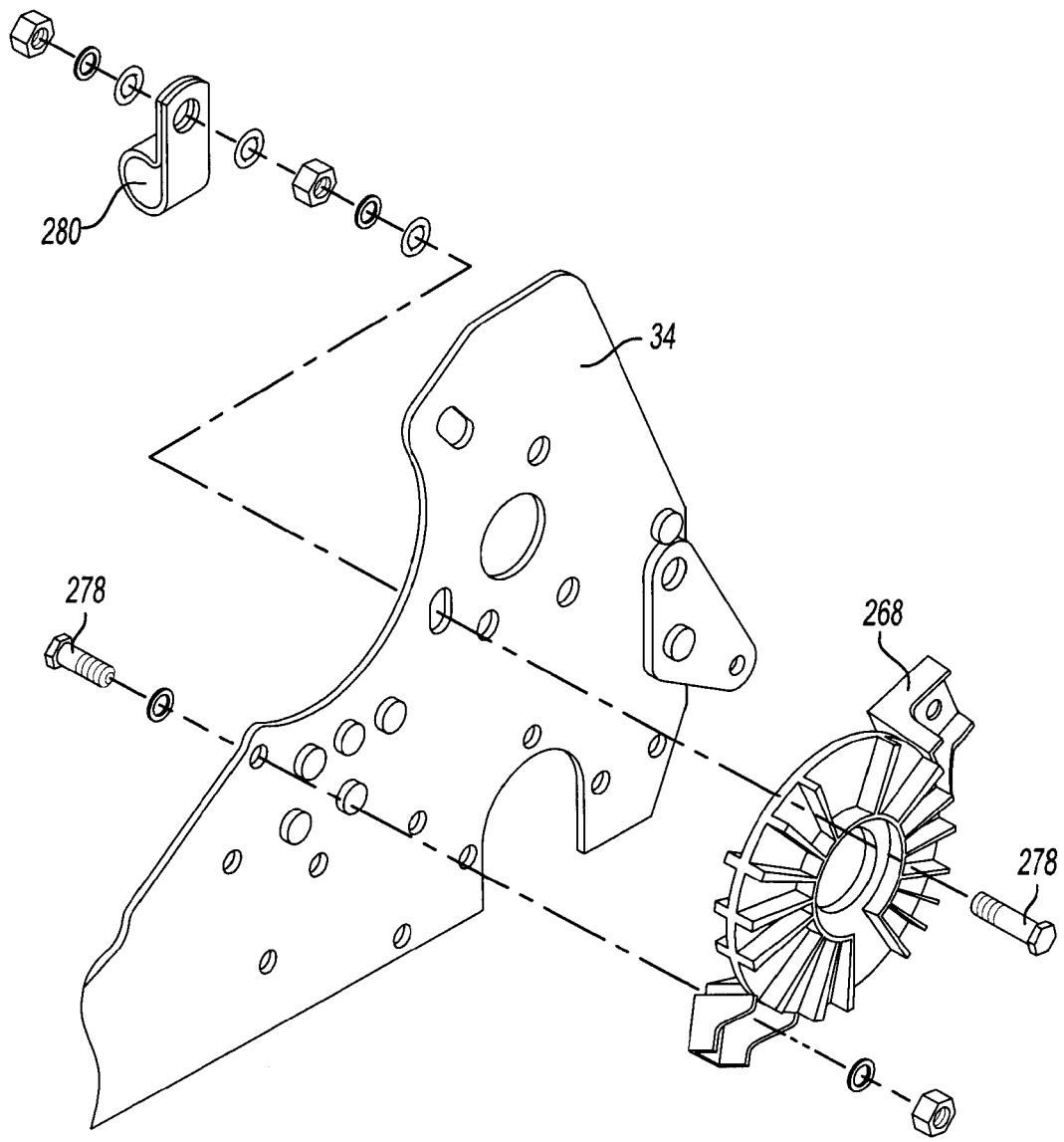
FIG. 6 is a partial exploded assembly view of an exemplary electric motor mounting assembly of the present disclosure.

Referring to FIG. 6, any of the electrical motors 266, 268 can be further directly connected to frame 34 (shown in FIG. 1) using a plurality of fasteners 278. A clamp 280 can further be provided which is attached by one or more of the fasteners 278 and provides for support of a third wiring harness 282 extending from controller 264. The controller 264 is adaptable to create a linear speed control signal which is used to control the speed of the greens mower 10 varying from the first or minimum signal defined at the null position and the second or maximum signal defined at the maximum rotated position of throttle plate, inclusive.

Figure 7:
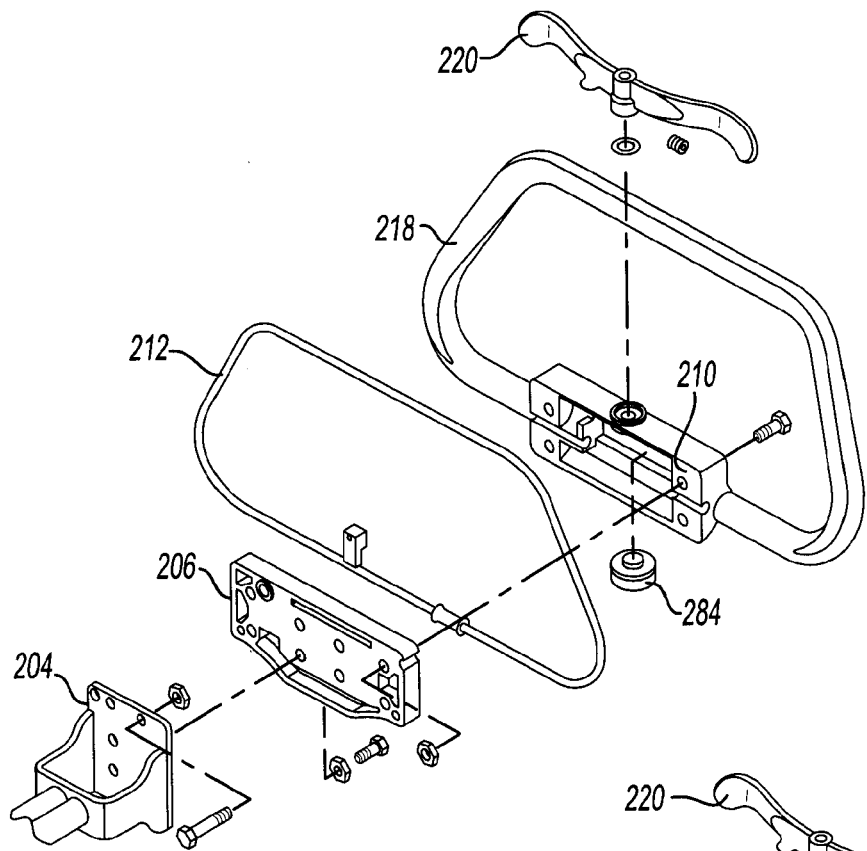
FIG. 7 is an exploded assembly view modified from FIG. 5 to show an encoder substituted for the rotary potentiometer.

Referring to FIG. 7, according to additional embodiments, an encoder 284 can be substituted for rotary potentiometer 225. Encoder 284 is connected to controller 264 in a similar manner as rotary potentiometer 225 and also functions to create a linear speed control signal when throttle plate 220 is rotated, and is used to control the speed of the greens mower 10.

Figure 8:
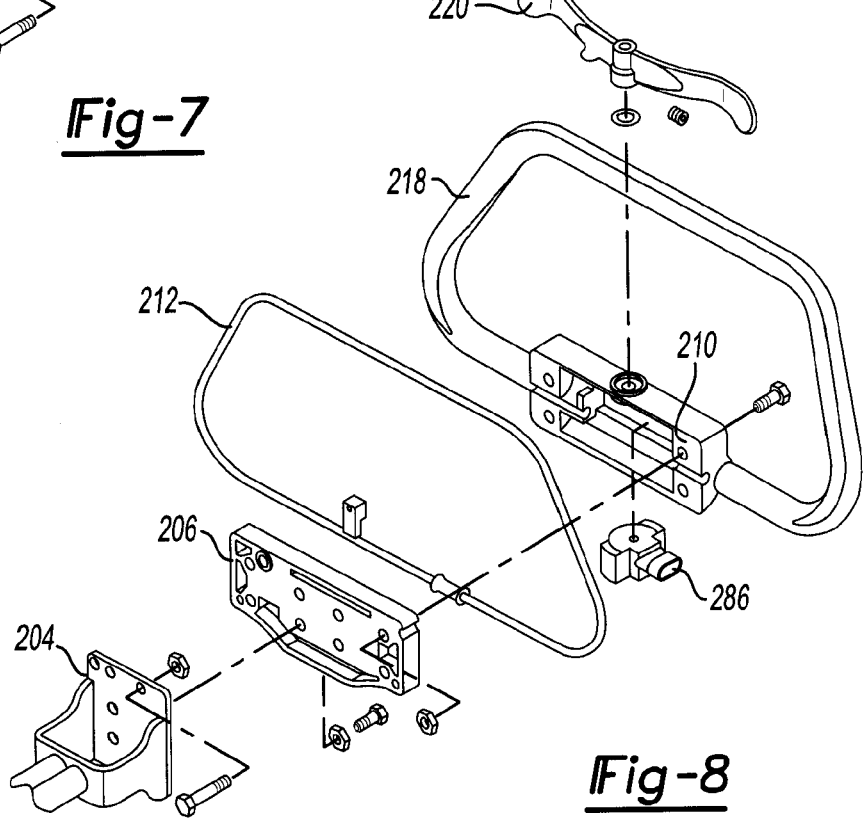
FIG. 8 is an exploded assembly view modified from FIG. 5 to show a position sensor substituted for the rotary potentiometer.

Referring to FIG. 8, according to additional embodiments, a position sensor 286 can be substituted for rotary potentiometer 225. Position sensor 286 can also be connected to controller 264 in a similar manner as rotary potentiometer 225 and also functions to create a linear speed control signal when throttle plate 220 is rotated, and is used to control the speed of the greens mower 10.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A walk-behind self-propelled apparatus, comprising:
   a mobile structure;
   a handle assembly coupled to the mobile structure, the handle assembly having opposed grip portions, a top portion interconnecting distal ends of the grip portions and a bottom portion interconnecting proximal ends of the grip portions;
   a control member positioned entirely between the grip portions and pivotable about an axis by either one of a right or a left hand of an operator without removal of the operator's hands from the grip portions, the axis being generally parallel to and fixed with respect to a plane extending through the grip portions and each of the top and bottom portions, and normal to a portion of the handle interconnecting the grip portions; and
   an electronic device connected to the handle assembly and adapted to output a signal which is variable depending on an angular degree of rotation of the control member from a null position to a maximum rotated position.

2. The walk-behind self-propelled apparatus according to claim 1, further comprising a drive system mounted to the mobile structure operable to propel the mobile structure on a ground surface.

3. The walk-behind self-propelled apparatus according to claim 2, further comprising a speed control actuation system operably coupled to the drive system and the control member.

4. The walk-behind self-propelled apparatus according to claim 3, wherein the electronic device is in communication with the speed control actuation system.

5. A walk-behind self-propelled apparatus, comprising:
   a mobile structure;

a handle assembly coupled to the mobile structure, the handle assembly having opposed grip portions and a bottom portion interconnecting proximal ends of the grip portions, the bottom portion of the handle defining a longitudinal axis;

a drive system mounted to the mobile structure operable to propel the mobile structure on a ground surface;

a speed control actuation system operably coupled to the drive system, the speed control actuation system having a control member pivotable about an axis by either one of a right or a left hand of an operator without removal of the operator's hands from the grip portions, the axis being between the opposed grip portions, normal to the longitudinal axis of the bottom portion and generally parallel to a plane extending between the grip portions; and an electronic device in communication with the speed control actuation system adapted to output a signal to the speed control actuation system which is variable depending on an angular degree of rotation of the control member from a null position to a maximum rotated position.

6. The walk-behind self-propelled apparatus according to claim 5, further comprising a ground engaging traction member rotatably coupled to the mobile structure, the ground engaging traction member imparting traction movement to the mobile structure for movement on the ground.

7. The walk-behind self-propelled apparatus according to claim 6, further comprising a power source outputting drive power, wherein the drive system is operably coupled between the power source and the ground engaging traction member, the drive system selectively transmitting the drive power to the ground engaging traction member.

8. The walk-behind self-propelled apparatus according to claim 5, wherein the electronic device comprises a potentiometer.

9. The walk-behind self-propelled apparatus according to claim 5, further comprising a controller, the electronic device being in communication with the speed control actuation system through a path including the controller.

10. The walk-behind self-propelled apparatus according to claim 9 wherein the controller is adaptable to create a linear speed control signal varying from a minimum signal defined at the null position and a maximum signal defined at the maximum rotated position inclusive.

11. A walk-behind self-propelled apparatus, comprising:
a mobile structure;
a handle assembly coupled to the mobile structure, the handle assembly having a pair of grip portions and a bottom portion interconnecting proximal ends of the grip portions, the bottom portion of the handle defining a longitudinal axis;

a power source outputting drive power;

a drive system operably coupled to power source, the drive system selectively transmitting the drive power in response to a drive command signal; a speed control actuation system operably coupled to the drive system adapted to provide the drive command signal, the speed control actuation system having a control member pivotable about a shaft extending from the control member through an axis extending through the shaft oriented normal to the longitudinal axis of the bottom portion of the handle in a first direction to output the drive command signal to increase drive speed of the self-propelled apparatus and in a second direction to output the drive command signal to decrease drive speed of the self-propelled apparatus, the axis being centrally between and in a plane defined by the grip portions; and an electronic device in communication with the speed control actuation system adapted to output a speed signal to the speed control actuation system which is variable depending on an angular degree of rotation of the control member from a null position to a maximum rotated position.

12. The walk-behind self-propelled apparatus according to claim 11, further comprising a ground engaging traction member rotatably coupled to the mobile structure, the ground engaging traction member imparting traction movement to the mobile structure for movement on the ground.

13. The walk-behind self-propelled apparatus according to claim 12 wherein the axis is generally parallel to a plane extending between the pair of grip portions of the handle assembly to permit an operator to operate the control member through thumb actuation without removing their hands from the pair of grip portions.

14. The walk-behind self-propelled apparatus according to claim 11 wherein the electronic device comprises a rotary potentiometer.

15. The walk-behind self-propelled apparatus according to claim 11 further comprising a controller in electrical communication with the electronic device, the controller adaptable to create a linear speed control signal varying from a minimum signal defined at the null position and a maximum signal defined at the maximum rotated position inclusive, the linear speed control signal operable to vary a propulsion speed of the walk-behind self-propelled apparatus.

* * * * *